3,200,987
THERMAL FUSE SCREW

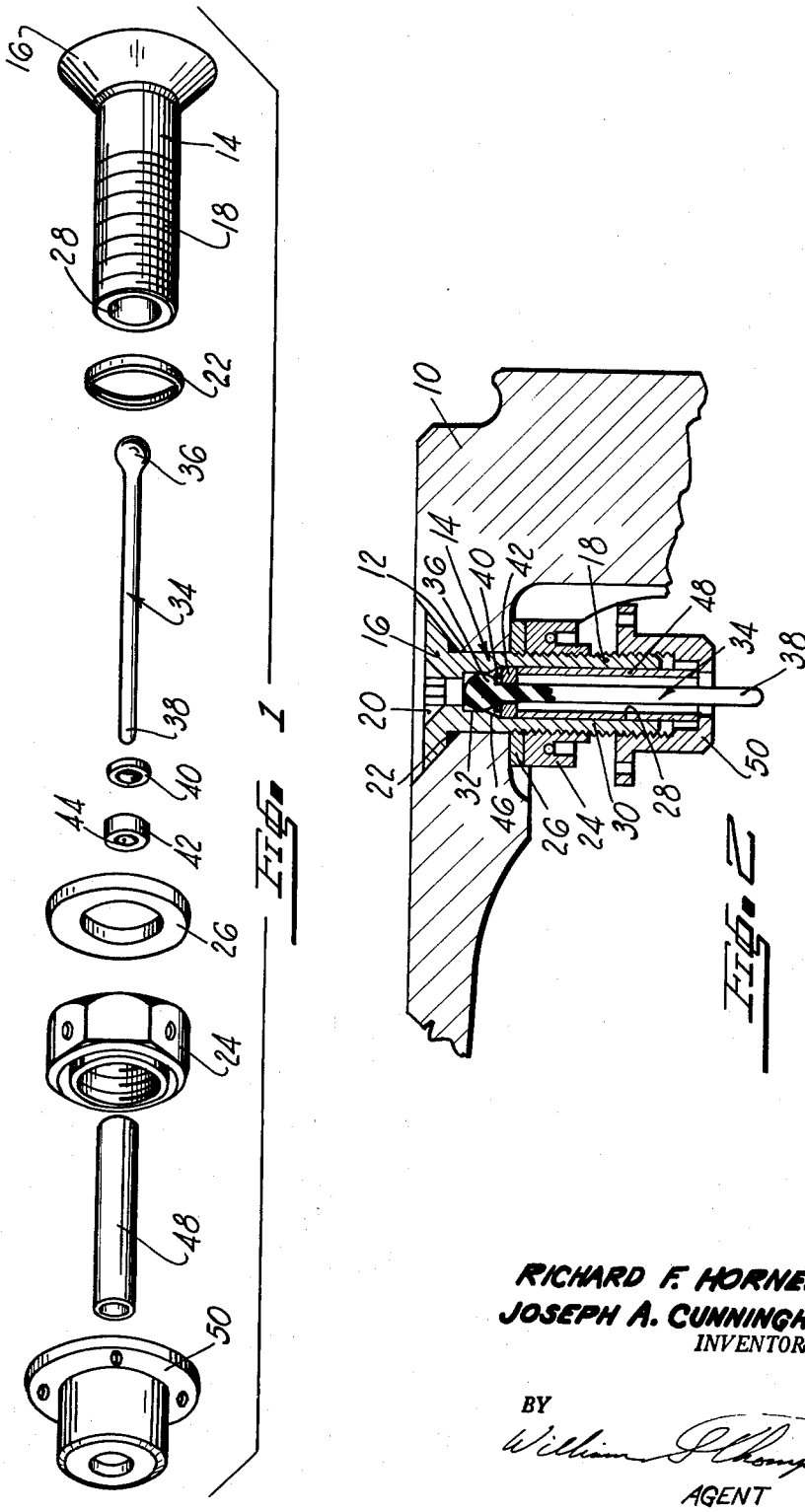

Richard F. Horner and Joseph A. Cunningham, both of South Bend, Ind., assignors to The Bendix Corporation, a corporation of Delaware
Filed Nov. 3, 1961, Ser. No. 149,967
3 Claims. (Cl. 220—89)

The present invention relates to an improvement in thermal fuse screws or plugs adapted for use with a pressurized vessel such as an aircraft wheel and tire combination or the like to release the pressure therein when a predetermined safe temperature limit has been exceeded.

The use of thermal fuse screws or plugs in an aircraft wheel as an overtemperature protection device to eliminate the hazard of exploding tires has been disclosed in copending application Serial No. 821,754, entitled "Safety Device" filed June 22, 1959, in the name of George E. Stanton and commonly assigned with the present application.

Field use of prior art fuse plugs has demonstrated limited service life and inadvertent softening of the tire or release of pressure due to imperfect sealing through the plug bore and uncontrollable creep properties of the fuse material. Although creep of the fuse material may be limited or reduced by providing a tapered bore or other equivalent means, it cannot be entirely prevented. Accordingly, over a period of time and as a result of the creep properties, fuse material will become displaced in the fuse screw bore and will ultimately blow out or leak causing inadvertent pressure release. Also, many suitable screw body materials have a considerably different coefficient of temperature expansion than do fusible plug materials of a tin or lead base. Thus, the fusible alloy plug will expand and contract at a different rate and work loose in the bore permitting leakage from the pressure vessel or tire.

Accordingly, it is an object of the present invention to provide a fuse screw having separate sealing means in the screw bore to prevent pressure leakage.

It is another object of the present invention to provide a fuse screw including indicating means for indicating when replacement of a fusible alloy insert is required because of excessive creep.

It is a still further object of the present invention to provide a fuse screw arranged so that a fusible alloy insert may be readily replaced externally of the pressure vessel in which the screw is used.

Other objects and advantages of the present invention will become apparent from the following description which proceeds with reference to the accompanying drawings wherein:

FIGURE 1 is an exploded isometric view of a preferred embodiment of a fuse screw in accordance with the present invention; and, FIGURE 2 is a section view of an assembled fuse screw projecting through the side wall of a pressure vessel illustrated as a fragmentary portion of an aircraft wheel.

Referring to the figures, a fragmentary portion of a pressure vessel wall is indicated at 10 which may be an aircraft wheel rim section adapted to have a high pressure area on the upper side and a low or atmospheric pressure on the lower side thereof. Wall 10 has a countersunk bore 12 formed therein into which is fitted a thermal fuse screw body 14 having a head end 16 and an externally threaded stem 18. Phillips head slots are formed at 20 in the head end 16 for holding the body 14 from turning for installation and removal. A preformed O ring seal 22 prevents leakage of pressure through the bore 12 of the pressure vessel.

Screw body 14 is secured in position in the bore 12 by means of nut 24 which threadedly engages the stem portion 18 and bears against wall 10 through washer 26. Nut 24 is preferably of the self-locking type one means of which may be accomplished by squeezing the nut and producing a slight ovalizing thereof. It should be understood that other means may be employed to retain screw body 14 in position in wall 10 such as staking, creating an interference fit in the removal direction, threading the bore 12, or the like.

An internal through-bore or passage generally indicated at 28 is formed longitudinally through screw body 14 and includes a first portion of relatively large diameter or cross sectional area at 30 and a second smaller portion at 32. A preformed seal and indicator member 34 is comprised of a spherical head end 36 and an elongated rod-like tail end 38. Member 34 is arranged in passage 28 such that the spherical head end sealingly engages the walls of the second portion 32 of passage 28 and the tail end extends through the first portion 30 externally of the screw body. To effect sealing within portion 32, the diameter of the head end 36 is formed oversize with respect to the dimension of portion 32. To facilitate installation of preformed seal 34, a tapered surface 46 is provided in screw body 14.

A small flat washer 40 and a fusible alloy plug 42 having a central aperture 44 are disposed in passage 28 immediately adjacent the head end of seal 34 with the tail end 38 passing through the central openings therein. The fusible alloy plug 42 is sized intermediate to the dimensions of portions 30 and 32 so that it will loosely slide into position and be restrained in one direction of movement by a shoulder marking the separation between the differing size passage portions. A spacer tube 48 is inserted in portion 30 to clamp the fusible alloy plug 42 in position. Spacer tube 48 extends externally from the screw body 14 where it abuts against hat shaped retaining nut 50 which in turn threadedly engages the stem portion 18 of screw body 14.

In a fuse plug of the disclosed arrangement, sealing through the passage 28 occurs at the peripheral contact area between seal 34 and the walls of the second portion 32. Thus, regardless of differing coefficients of expansion between fusible alloy plug 42 and the screw body 14 an effective seal is maintained.

Seal 34 is normally restrained against expulsion under influence of pressure by means of fusible alloy 42 which restrains said seal in through-bore 12. When subjected to high temperatures which would be injurious to aircraft wheel resulting from extreme brake applications, fusible alloy plug 42 will melt or sufficiently soften to permit the high air pressure bearing on the spherical end of seal 34 to force seal 34, washer 40 and at least a portion of the alloy plug 42 out through the sleeve 48 thus venting the pressurized area to the atmosphere.

On installation of the fuse screw assembly, for example in an aircraft wheel the ground mechanic may trim the tail portion 38 of seal 34 flush with retainer nut 50. As the fusible plug 42 displays its inherent creep property when subject to high, but safe wheel temperatures, the seal 34 will be gradually displaced downward by influence of the pressure on the upper side of wall 10. The tail end 38 will therefore project past retainer 50 in direct relation to the displacement of plug 42 due to creep. When the relative positions of tail 38 and retainer 50 indicate the maximum safe amount of plug displacement has been reached, the retainer 50 may be unscrewed; spacer 48, plug 42, washer 40 and seal 34 removed or pulled from passage 28 and a new fusible alloy plug inserted. This can normally be done quickly enough to avoid complete loss of pressure within the tire and iwthout the necessity of removing the tire.

Having thus described our invention, what is claimed as new therein is:

1. A thermal fuse screw for use with a pressurized vessel comprising: a screw body having a stepped diameter through-bore formed substantially along the longitudinal axis of said screw body, said stepped diameter having a first small diameter passage section and a second larger diameter passage section forming a shoulder at the junction of said passages, said passages arranged such that said small diameter passage section is on the pressurized side of said screw body relative to said second larger diameter passage section, and a resilient preformed spherical seal disposed in said small diameter passage section operative to sealingly engage said screw body, a fusible alloy plug removably disposed in said larger diameter passage section operative to restrain said seal against expulsion from said through-bore under pressure forces within the pressurized vessel, means peripherally securing said alloy plug in said larger diameter passage section, said fusible alloy plug operative on melting to permit said spherical seal being expelled from said through-bore under influence of pressure contained in the pressurized vessel.

2. A thermal fuse screw for use with a pressurized vessel comprising: a screw body having a longitudinally disposed through-bore formed therein, said through-bore formed to have a stepped diameter configuration with a first portion having a diameter smaller than a second portion, said first portion of said through-bore located adjacent the end of said screw body adapted to communicate with the interior of a pressure vessel, a fusible alloy plug having a diameter intermediate to that of said first and second portions disposed in said through-bore and restrained in one direction by said smaller diameter first portion, a spacer sleeve disposed in said second portion of said through-bore bearing on one end against said fusible alloy plug and having another end protruding from said through-bore, a retaining nut threadedly secured to said screw body and adapted to bear against said spacer sleeve to lock said sleeve and said fusible alloy plug into position, and a preformed oversized spherical seal disposed in said first portion of said through-bore to prevent pressure leakage therethrough, said spherical seal being disposed on the pressurized side of said fusible alloy plug and normally restrained by said plug when solid against explosion from said through-bore.

3. A thermal fuse screw for use with a pressurized vessel comprising: a screw body having a longitudinally disposed passage formed therethrough, said passage formed to have a first portion of smaller cross sectional area than a second portion, said first portion located adjacent the end of said screw body adapted to communicate with the interior of a pressure vessel, a fusible alloy plug loosely disposed into said second portion of said passage and having a peripehral surface generally conforming to the shape of said passage, removable means clamping the outer periphery of said fuse plug to positively locate said plug within said passage at the juncture between said first and second portions, said fusible alloy plug having an aperture therethrough and a preformed seal and indicator member formed from resilient material and having a spherical oversized head end disposed in said first portion of said passage adjacent said fusible alloy plug and sealingly engaging the walls of said passage, said seal and indicator member including an elongated tail end extending through the aperture formed in said plug and extending externally from said screw body, said spherical oversized head of said preformed seal being larger than said aperture formed in said plug so that said plug when solid restrains said seal against expulsion from said through-bore.

References Cited by the Examiner

UNITED STATES PATENTS

| | | | |
|---|---|---|---|
| 776,834 | 12/04 | Goebel | 220—89 |
| 1,670,764 | 5/28 | Donnelly. | |
| 1,744,977 | 1/30 | Lovekin. | |
| 1,924,417 | 8/33 | Ryan | 137—72 |
| 2,271,786 | 2/42 | Watkins | 220—89 |
| 2,357,620 | 9/44 | Thomas | 220—89 |
| 2,810,631 | 10/57 | Kanenbley | 220—88 |

THERON E. CONDON, *Primary Examiner.*

EARLE J. DRUMMOND, *Examiner.*